United States Patent [19]

Sauriol

[11] E Re. 28,640

[45] Reissued Dec. 9, 1975

[54] METER HOUSING

[75] Inventor: John T. Sauriol, Dallas, Tex.

[73] Assignee: Intercontinental Plastics Manufacturing, Dallas, Tex.

[22] Filed: Jan. 15, 1975

[21] Appl. No.: 541,214

Related U.S. Patent Documents

Reissue of:

[64] Patent No.: 3,717,963
Issued: Feb. 27, 1973
Appl. No.: 121,480
Filed: Mar. 5, 1971

[52] U.S. Cl. ..... 52/19; 52/309; 137/364; 404/5

[51] Int. Cl.[2] ..... E02D 29/08

[58] Field of Search ..... 52/19, 20, 21, 23, 309, 52/630; 137/236, 343, 364, 367, 371; 404/5

[56] References Cited

UNITED STATES PATENTS

| | | | |
|---|---|---|---|
| 2,099,479 | 11/1937 | Heinkel et al. | 137/367 |
| 3,268,636 | 8/1966 | Angell | 264/51 |
| 3,276,176 | 10/1966 | Jonsson et al. | 52/704 X |
| 3,548,864 | 12/1970 | Handley et al. | 137/364 |
| 3,621,623 | 11/1971 | Downes | 52/20 |

*Primary Examiner*—Price C. Faw, Jr.
*Attorney, Agent, or Firm*—Kenneth R. Glaser

[57] ABSTRACT

A water meter housing and cover has a body portion of generally frustoconical shape. The top of the body member has a recessed flange therein for receiving a cover. The cover has a downwardly extending ring integral therewith for reinforcement. The body has vertical slots running from the bottom portion thereof extending upwardly less than the height of the body. The exterior of the body further has peripheral reinforcing stabilizing rings integral therewith.

7 Claims, 5 Drawing Figures

INVENTOR:
JOHN T. SAURIOL

Richards, Harris & Hubbard
ATTORNEYS

INVENTOR:
JOHN T. SAURIOL

Richards, Harris & Hubbard
ATTORNEYS

METER HOUSING

Matter enclosed in heavy brackets [ ] appears in the original patent but forms no part of this reissue specification; matter printed in italics indicates the additions made by reissue.

DESCRIPTION OF PRIOR ART

This invention relates to protective housings in general and in particular to underground meter housing with surface access openings.

Prior housings for isolating and protecting underground meters such as water meters have been made of variety of structural materials, for example, concrete, cast and corrugated sheet metals, and flexible plastics. These housings have taken a variety of shapes including circular cast and corrugated metal housing, rectangular concrete, and rectangular flexible plastic housings.

These prior housings have been the sujbect of many problems. The oldest prior housings were constructed of precast concrete and metal. Some such housings contain a concrete body in conjunction with a metal lid. Any of the foregoing combinations are, obviously, difficult to handle because of their bulkiness and great weight. In addition, the concrete housings have a tendency to be easily broken. Also, since these housings are relatively heavy, they have a great tendency to sink into the ground and thus must be periodically excavated, raised and stabilized.

For some of the foregoing reasons, plastics, specifically certain semirigid plastics, were tried as construction material for water meter housings. Prior attempts at making such housings have met with failure for a number of reasons. Firstly, the plastics utilized are susceptible to breaking. In addition, high pressure of the earth on these semirigid plastic housings has caused sufficient deformation so that the covers therefor have been wedged into place. Such wedging has caused difficult cover removal and virtually impossible cover replacement since the cover opening deforms to less than original size.

It is desirable, therefore, to possess a water meter housing which is substantially structurally rigid, which is lightweight, which will tend not to sink into the ground necessitating raising, which can withstand rough handling without breaking, which provides easy access for underground inlet and outlet pipes to a meter housed therein, and which provides easy access to the interior thereof.

SUMMARY OF THE INVENTION

The present invention provides the foregoing desirable attributes with a meter housing comprising an upstanding wall defining a cavity open to the bottom and top thereof, an annular top member integral with the wall at the top peripheral portion thereof, a recessed flanged means integral with the inner peripheral portion of the top member for receiving a cover. Also provided is a cover for the housing comprising a unitary body including a plate of generally circular construction integral with an annular downwardly extending ring of a diameter less than the plate diameter, reinforcing means extending downwardly and diametrically across the ring and integral with the plate and the ring. Both the housing and the cover can be made from a molded synthetic thermoplastic material such as structural foamed polyethylene.

BRIEF DESCRIPTION OF THE DRAWINGS

A better understanding of the ensuing specification can be derived by reading it in conjunction with the accompanying drawings wherein.

DESCRIPTION OF THE PREFERRED EMBODIMENT

The present invention is described in relation to a preferred embodiment. It is to be understood that various substitutions, alterations and other equivalent structural changes can be made without departing from the inventive concept. The present invention is intended to be limited only by the appended claims.

Figure 1:
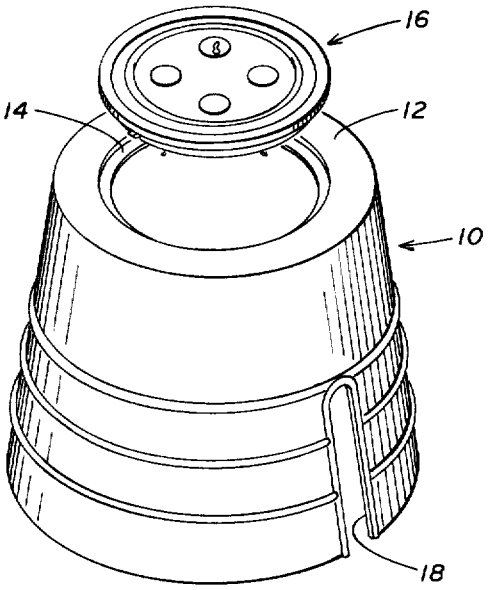
FIG. 1 is an isometric view of the housing and cover with the cover raised above the receptacle.

Referring now to FIG. 1, the housing generally designated 10 has a generally frustoconical shape. The top 12 of the housing has a recessed flange 14 for receiving the cover 16. Housings of this type are generally used for protecting submerged devices such as water meters from the surrounding earth, concrete or other subground level construction material. Normally, the top of the housing and the top of the cover are at ground level. Everything below the top 12 of the housing is generally underground. An opening 18 and a similar opening 20 (illustrated in later figures) diametrically opposed from opening 18 are provided for access for piping to, for example, a water meter.

The housing and cover of the present invention are molded from a synthetic polymeric material which provides rigidity, high strength and high impact resistance. Most preferred for the present invention is a foamed polyethylene which can be utilized in accord with the teachings of U.S. Pat. No. 3,268,636.

Figure 2:
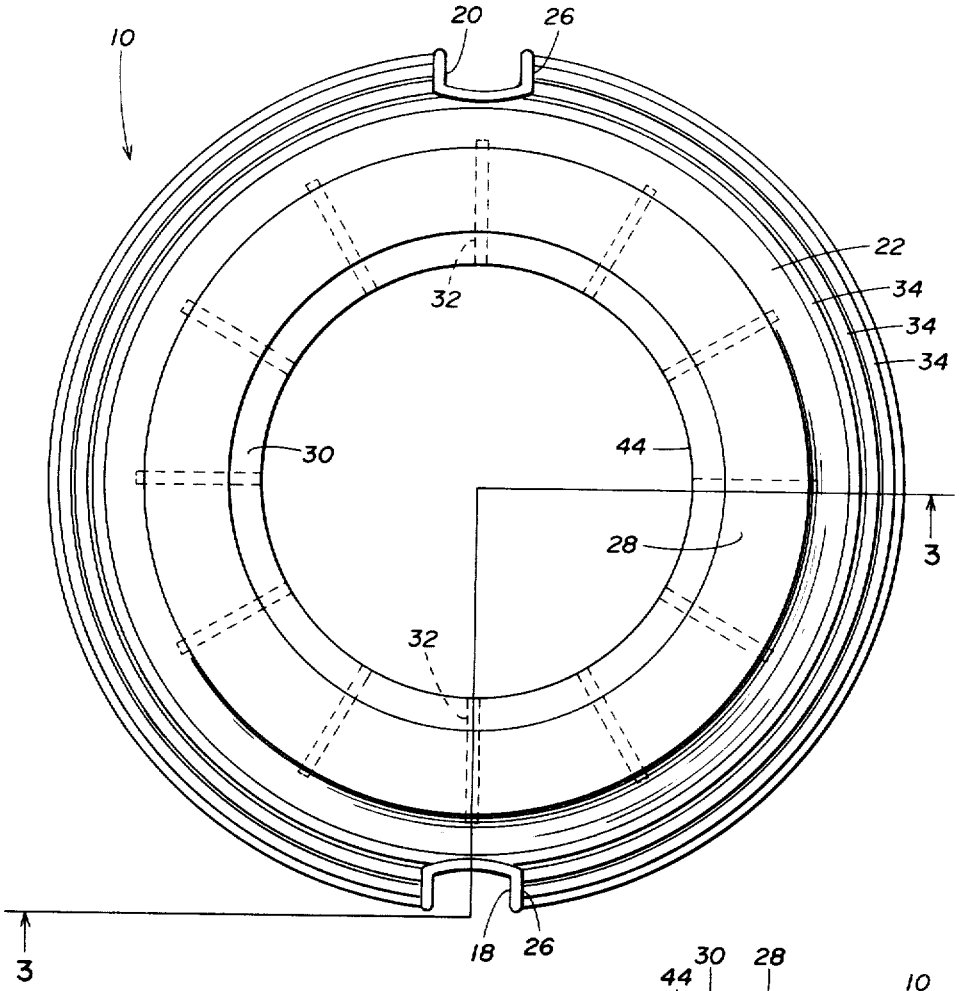
FIG. 2 is a top view of the housing of the present invention.
Figure 3:
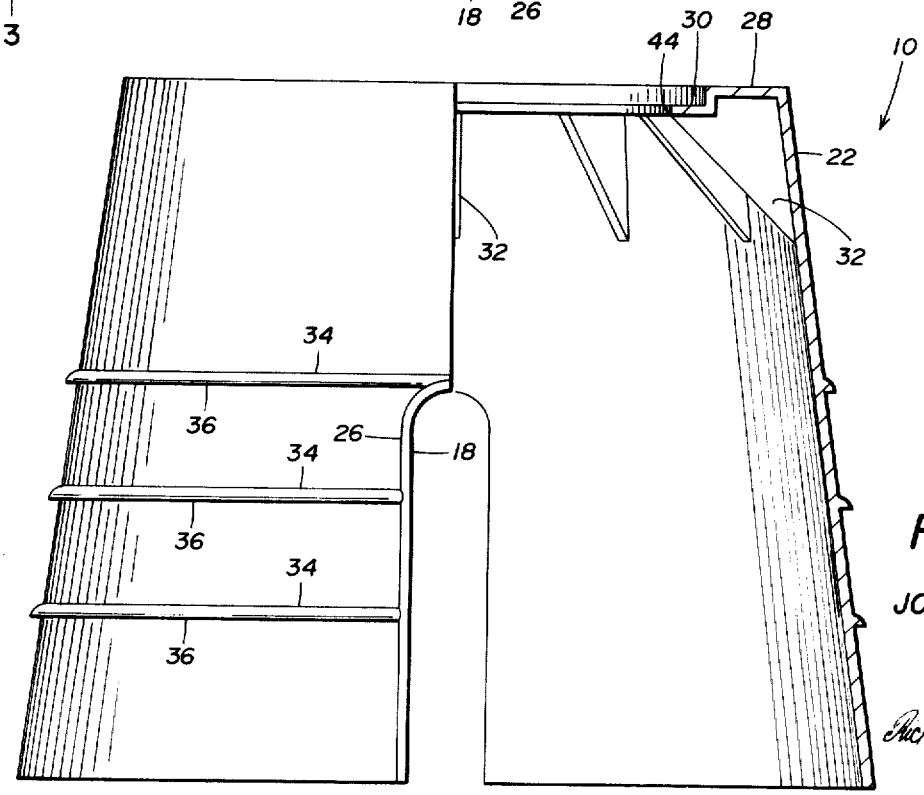
FIG. 3 is a partial cross-sectional elevational view of the housing taken along section line 3—3 of FIG. 2.

Referring now jointly to FIGS. 2 and 3, the housing 10 includes a sidewall or body portion 22 which in the preferredform of the invention is generally of a frustoconical shape. The sidewall contains openings 18 and 20 extending upwardly from the bottom of the sidewalls 22 to a predetermined height. Openings 18 and 20 are provided for access of pipes or other conduits to the interior cavity of the housing 22. Surrounding the openings 18 and 20 are reinforcing flanges 26. In the preferred embodiment such openings 18 and 20 are provided at diametrically opposed portions of the body 22.

Integral with the top peripheral portion of the wall 22 is an annular ring portion 28. Connected to the interior peripheral portion is a recessed flange 30. The flange is of such size and recessed to such a distance that it will receive the cover (described in conjunction with FIGS. 4 and 5) retaining the cover top substantially flush with the top of the ring portion 28. Internal of the wall 22 are a plurality of reinforcing means 32. In the preferred embodiment of the reinforcing means 32 include a plurality of rib members integral with the wall 22, ring portion 28, and recessed flange 30. The flanges provide additional strength to the housing and support for recessed flange 30 and ring portion 28. It is, of course, to be understood that the reinforcing means illustrated is but one form of reinforcement which can be provided.

As stated, one of the prior art problems has been to eliminate or reduce the sinking of meter housings into the ground as the earth around them compacts. The peripheral stabilizer rings or flanges 34 are provided to combat this problem. Three such flanges 34 have been illustrated. The flanges 34 are integral with and extend outwardly from the exterior of housing 22. The bottom portion 36 of the flanges grips the earth or other materials surrounding the housing tending to prevent the sinking of the housing. In addition, the flanges 34 provide extra support and strength to the body 22, eliminating the crushing deformation effect experienced in prior plastic housings.

Figure 4:
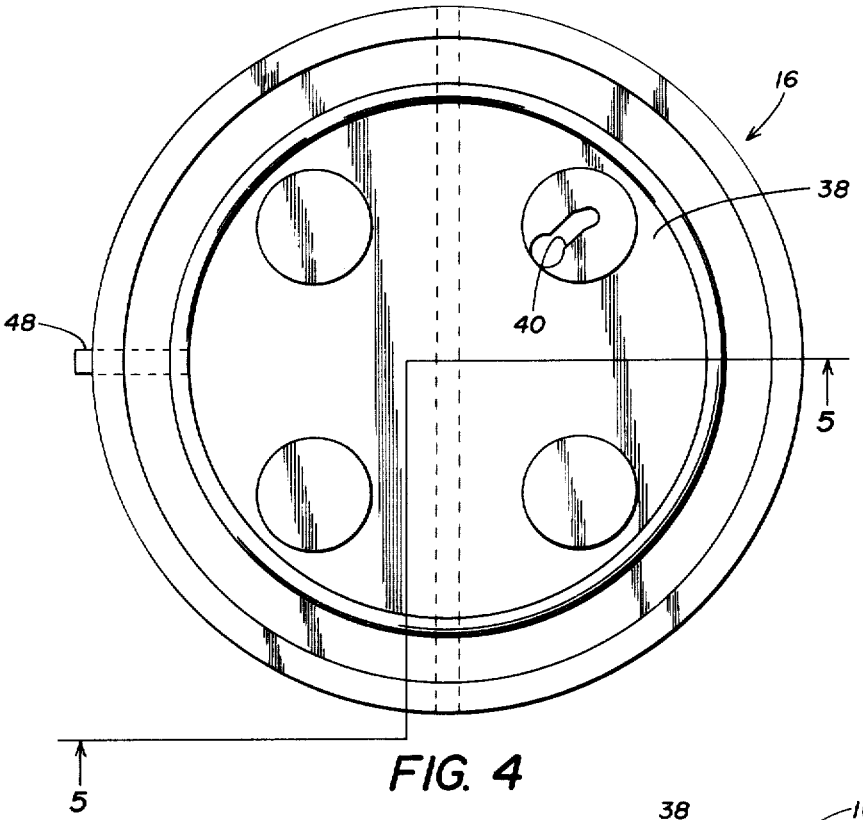
FIG. 4 is a top view of the housing cover of the present invention.
Figure 5:
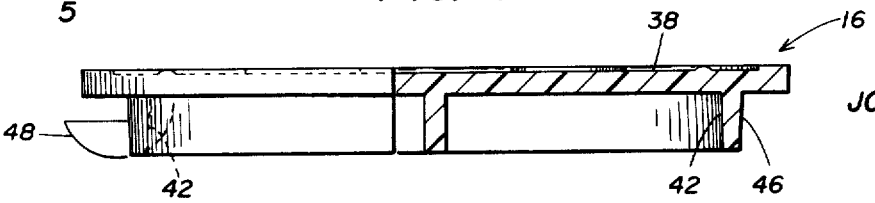
FIG. 5 is a partial cross-sectional elevational view of the cover taken along section line 5—5 of FIG. 4.

Referring now to FIGS. 4 and 5, the cover for the housing 10 described above is a unitary cover structure 16 also molded from a synthetic polymeric material, such as that from which the housing is molded. The cover includes a generally disc or plate-shaped top portion 38, the diameter of which is sized to fit into the recessed flange 30 (FIGS. 2 and 3). It is, of course, to be understood that the manufacturer's name, the identification of what is contained within the housing, and other descriptive material can be integrally molded on the top of the cover 16.

The cover 16 is provided in the preferred embodiment with a key aperture 40 through which an appropriate key can be inserted to engage a locking mechanism to prevent theft of the cover or access to the interior of the housing. The locking mechanism is not shown since it does not form a part of the present invention.

Extending downwardly from the bottom portion of the plate 38 is a ring member 42 integral with the plate 38. The ring member 42 provides additional structural reinforcement for the plate 38 and is sized such that it will fit into the opening 44 (FIGS. 2 and 3) formed by recessed flange 30. The exterior surface 46 of the ring member 42 is slightly tapered radially inwardly from where it joins the plate 38. This provides easy fitting of the cover into opening 44. Also provided on the cover is a flange 48 which is integral with the plate 38 and ring 42. Flange 48 is spaced from the plate 40 exterior of the ring 42 a distance slightly greater than the vertical thickness of recessed flange 30 (FIGS. 2 and 3). Flange 48 fits under recessed flange 30 to retain the cover blank in the opening 44 at a position opposite the locking mechanism (not shown).

The cover of the present invention when appropriately sized can be used with other types of housings manufactured from other materials. It is readily adaptable to be used both with prior metal housings and with prior concrete castings now in use.

What is claimed is:

1. A water meter housing assembly comprising:

an upstanding wall defining a frustoconical housing having a cavity open to the bottom and top thereof, an annular top member integral with said wall at the upper peripheral portion thereof, an annular flange integrally formed about the inner periphery of said top member and recessed toward the interior cavity of said frustoconical housing, said annular flange defining an opening in the top of said housing, a cover for said housing including a circular plate dimensioned to fit within the inner periphery of said annular top member and to abut against the upper portion of said annular flange, said cover further including an annular downwardly extending ring of a diameter to fit through said opening defined by said annular flange, at least one substantially vertical opening to said cavity extending from the bottom portion of said wall to a predetermined location less than the height of said wall, and a plurality of stabilizer rings extending about the circumference of said wall and vertically spaced along said wall to tend to prevent sinking of said housing.

2. The housing assembly of claim 1 and further comprising a plurality of reinforcing ribs integrally connecting said wall, said top member and said annular flange.

3. The housing assembly of claim 1 wherein said housing and said cover are constructed from foamed polyethylene.

*4. A water meter housing assembly for underground installation, comprising:*

*a main housing portion of semi-rigid plastic material susceptible to deformation by earth pressure when installed underground, said main housing portion defined by a circumferential enclosing and upstanding wall having a cavity open to the bottom and top thereof,*

*closure member support means of said semi-rigid plastic material integral with said wall at the top thereof, said closure member support means comprising a generally downwardly extending annular portion circumferentially extending around the entire cavity and separated from said wall by a circumferentially extending channel, said annular portion terminating in a generally horizontally extending flange defining a ledge,*

*a plurality of ribs intersecting said channel around the entire circumference thereof, each of said ribs being integrally formed with said wall and said closure member support means, thereby to prevent deformation of said closure member support means with respect to said wall when subjected to said earth pressure, whereby the inner periphery of said annular portion of said closure member support means maintains a substantially constant circumference; and*

*a closure member dimensioned to fit within the substantially constant circumference of the inner periphery of said annular portion and to be supported by said ledge.*

*5. The water meter housing assembly as defined by claim 4 wherein said circumferential enclosing and upstanding wall slopes outwardly in a direction from the top to bottom thereof, and further including at least one earth engaging flange integral with and extending about the circumference of said wall to prevent the sinking of said main housing portion.*

*6. A water meter housing assembly comprising:*

*an upstanding wall defining a frustoconical housing having a cavity open to the bottom and top thereof,*

*an annular top member integral with said wall at the upper peripheral portion thereof,*

*an annular flange integrally formed about the inner periphery of said top member and recessed toward the interior cavity of said frustoconical housing, said annular flange defining an opening in the top of said housing,*

*a cover for said housing including a circular plate dimensioned to fit within the inner periphery of said annular top member and to abut against the upper portion of said annular flange, said cover further including an annular downwardly extending ring of a diameter to fit through said opening defined by said annular flange,*

*at least one substantially vertical opening to said cavity extending from the bottom portion of said wall to a predetermined location less than the height of said wall, and*

*at least one stabilizer ring extending about the circumference of, and transverse to the vertical direction of, said wall to tend to prevent sinking of said housing.*

*7. A water meter housing assembly comprising:*

*an upstanding wall defining a housing having a cavity open to the bottom and top thereof, the upstanding wall sloping outwardly from the top toward said bottom,*

*a top member integral with said wall at the upper peripheral portion thereof,*

*a flange integrally formed about the inner periphery of said top member and recessed toward the interior*

*cavity of said housing, said flange defining an opening in the top of said housing,*

*a plurality of ribs integrally connecting said upstanding wall, said top member, and said flange, said plurality of ribs preventing the deformation of the opening in the top of said housing by earth pressure when the housing is installed underground,*

*a cover for said housing dimensioned to fit within the inner periphery of said top member and to abut against the upper portion of said flange, said cover further including a downwardly extending peripheral portion dimensioned to fit through said opening defined by said flange,*

*at least one substantially vertical opening to said cavity extending from the bottom portion of said wall to a predetermined location less than the height of said wall, and*

*at least one stabilizer ring member extending about the circumference of, and transverse to the vertical direction of, said wall to tend to prevent sinking of said housing.*

* * * * *